United States Patent [19]

Danowski

[11] 4,183,841
[45] Jan. 15, 1980

[54] FILLED COMPOSITION CONTAINING PHENOL-ALDEHYDE RESIN AND BUTADIENE-ACRYLONITRILE POLYMER

[75] Inventor: Rudolph J. Danowski, Oxford, Conn.

[73] Assignee: The United States of America as represented by the Secretary of the Navy, Washington, D.C.

[21] Appl. No.: 473,571

[22] Filed: Jul. 16, 1965

[51] Int. Cl.$^2$ ............................................. C08L 61/06
[52] U.S. Cl. ..................................... 260/38; 102/103; 525/139; 264/331
[58] Field of Search ................... 260/845, 38; 264/331; 117/161 A, 161 L; 102/103

[56] References Cited

U.S. PATENT DOCUMENTS

| | | | |
|---|---|---|---|
| 2,605,248 | 7/1952 | Fisk | 260/845 |
| 2,659,706 | 11/1953 | Fisk | 260/845 X |
| 2,878,503 | 3/1959 | Been et al. | 260/845 X |
| 2,958,288 | 11/1960 | Campbell, Jr. et al. | 149/20 X |

FOREIGN PATENT DOCUMENTS 662981   5/1963   Canada ...................................... 260/845

OTHER PUBLICATIONS

Smith, British Plastics, vol. 27, 1954, pp. 176 to 179 and 213 to 217.

*Primary Examiner*—Leland A. Sebastian
*Attorney, Agent, or Firm*—R. S. Sciascia; A. L. Branning

EXEMPLARY CLAIM

1. An improved char and erosion resistant ablative thermal insulator composition, which can be used for flexible combustion chambers which comprises:
   (a) 70–140 parts by weight of a phenolic-aldehyde resin,
   (b) 40–100 parts by weight of a filler selected from the group consisting of Group I and II metal phosphates, carbonates, acetates, oxalates and sulfites, and
   (c) 100 parts by weight of a butadiene-acrylonitrile polymer having an acrylonitrile content between about 20 and 45%.

8 Claims, No Drawings

FILLED COMPOSITION CONTAINING PHENOL-ALDEHYDE RESIN AND BUTADIENE-ACRYLONITRILE POLYMER

This invention pertains to a novel insulator composition and a method for its preparation and more particularly to an improved char and erosion resistant ablative type of thermal insulator which is useful in a flexible combustion chamber. More specifically, the present invention relates to an insulator that protects a rocket motor case from hot propellant gases.

With the rapid development of rockets there has been a search for insulating materials to protect the motor casings from hot propellant gases. In particular, the insulator desired should be flexible so that it can follow the movement of the rocket chamber wall (which corresponds approximately to a 3% elongation) that occurs just after ignition. It should also be easily fabricated and highly resistant to the erosive action of propellant gases. In addition, due to the weight and space limitations inherent in rockets it is desired that the insulator should be capable of being used in low overall weight and reduced thickness.

Accordingly, it is an object of this invention to provide a new insulator composition.

Another object is to provide a flexible ablative type of thermal insulator with improved char and erosion resistance.

A further object is to provide an insulator that protects a flexible rocket motor case from hot gases.

Still another object is to provide a rocket motor case insulator that has an improved performance and is used in a lower overall thickness and weight.

These and other objects will become more readily apparent from reading the following specification.

The objects of this invention are accomplished by a composition comprising a rubbery butadiene polymer, a phenolic resin, and an inorganic filler that decomposes at a temperature between about 300° and 800° C. More particularly, the composition comprises a butadiene-acrylonitrile copolymer wherein the acrylonitrile varies from 20–45% by weight, a phenolic-aldehyde resin ("novolac" or "resole") and a boric acid or Group I or II metal phosphate, carbonate, acetate, oxalate, bicarbonate, sulfite, sulfate or formate filler.

The phenolic-aldehyde resin employed may be any one of the well known class of "novolacs" (no methylol groups) and "resoles" (methylol groups) that are produced by condensing a phenolic compound with an aldehyde. As examples of phenolic compounds there may be mentioned phenol itself; the ortho, para and meta cresols; the xylenols; the dihydroxy benzenes such as resorcinol; the polynuclear phenols such as the naphthols; and the various alkylated, alkenylated, aralkylated, carboxylated, alkylolated, etc. are derivatives of phenols such as O-ethyl phenol, carvacrol, salicylic acid and the like. As suitable aldehydes there may be mentioned formaldehyde in any of its forms; acetaldehyde; propionaldehyde; and the like, with formaldehyde being preferred. The resin may also be of the "modified" type produced by the addition of oils, alkyd resins, etc. during the condensation.

As examples of fillers that are operable in this invention there may be mentioned, potassium sulfite, potassium dihydrogen phosphate, sodium acetate, sodium carbonate, potassium oxalate and the like. From among these the best results are obtained with potassium oxalate, potassium sulfite, sodium carbonate, and sodium acetate.

The composition is generally prepared by first banding the rubbery copolymer on a rubber mill and then adding the phenolic resin at an elevated temperature to insure a fluxing of the resin and an adequate dispersion of the resin in the rubber. It is important, however, to control the time and temperature of the mixing to prevent a premature curing. The temperature may range from about 140° F. to 300° F. with very short milling times (about 5 minutes) at the upper limit and longer milling times (e.g. as high as 60 minutes) at the lower limit. The remainder of the materials, i.e. the filler, processing aids, and vulcanization agent are added on a cool mill and the composition is compression molded to form the insulator.

The composition generally comprises per 100 parts by weight of rubbery copolymer about 70–140 parts of phenolic resin, with 100–120 parts being preferred and about 40–100 parts of filler, with 60–80 being preferred. The rubbery copolymer "plasticizes" the phenolic resin giving the mixture a higher impact strength and elongation at break than the resin alone with increasing amounts of copolymer increasing its elongation while decreasing its tensile strength and hardness.

The invention will be more readily understood by reference to the following specific examples. It is to be understood, however, that the scope of the invention is only illustrated and not limited thereby.

The following tests were used to evaluate the performance of the insulators of the invention:

ABL Peripheral Slab Motor

The device used is a 5 inch diameter rocket test motor using modified double base propellant (fortified with aluminum and oxidizer). The test samples are located around the periphery of an extension tube mounted between the motor case and nozzle. The hot exhaust gases flow parallel to the exposed face of the samples. The test conditions are as follows: temperature—6300° F.; pressure—250–300 psi; duration—30 seconds; and gas velocity at the sample—30 feet/sec.

Char rate (C.R.) is the average rate of destruction of virgin insulator expressed in mils/sec. The calculation follows: Original thickness of sample minus thickness of uncharred insulator divided by the time of test.

Erosion rate (E.R.) is the average rate of reduction of thickness of gross insulator (including char) expressed in mils/sec. The calculation follows: Original thickness of the sample minus final thickness of sample divided by time of test.

ABL Blast Tube Motor

The same motor as above is used, except an additional small diameter tube is located between the peripheral slab extension tube and the nozzle. The test sample is tubular, being 6" long, ½" wall and ¾" inside diameter. This sample is located mid-way along the length of the tube between two 1½" long samples of AA Spauldite which acts as retaining rings. The test conditions are the same as for the peripheral slab motor except that local gas velocity is approximately 1200 feet/sec. (assuming no change in gross insulator thickness during the test).

The char rate and the erosion rate are calculated as above.

ARC Test Motor

The motor used is approximately six inches in diameter and uses aluminized Arcite propellant. The six samples are located symmetrically in the approach face of the nozzle. The test conditions are: temperature—5600° F.; pressure—1000 psi; gas velocity at the samples—100-300 feet/sec.

The char rate is calculated as above.

U.S. Rubber O/A Torch Test

A 2" square, approximately ¼" thick, insulated sample is mounted in a water-cooled frame. A brass disc thermal couple is mounted flush against the backside of the sample. An oxyacetylene (mole ratio $O_2/C_2H_2=1.17$ and mass flow rate of 258 standard cubic feet per hour) flame is impinged on the surface. The sample is at the tip of the inner cone of the frame. The flame temperature is about 6000° F. The time required for the sample backside to reach 400° F. is measured.

The char rate is: Original thickness of sample divided by the time for backside to reach 400° F., expressed in mils per second.

Insulation index is 1000/char rate, expressed in seconds/inch.

Materials Used

Paracril D-Butadiene-acrylonitrile copolymer (about 40% acrylonitrile) made by Naugatuck Chemical, Division of United States Rubber Company.

Hycar 1042—a butadiene acrylonitrile copolymer produced by B. F. Goodrich Chemical Company.

Hycar 1051—it is similar to Hycar 1042 except with higher acrylonitrile content.

Durez 12687—a modified phenolic-formaldehyde novolac resin produced by Durez Plastics Division, Hooker Chemical Corporation, New York.

BKR-2620—resol phenolic resin produced by Union Carbide Plastics, a division of Union Carbide Corp., New York.

EXAMPLE I

This illustrates the method generally used for preparing the insulator composition.

The butadiene-acrylonitrile copolymer is first banded on a cool two-roll rubber mill (60°–80° F.). The temperature of the mill is then raised to about 250° F. and the phenolic resin is added and dispersed in the rubber. The mill is then cooled (60°–80° F.) and the remainder of the ingredients, i.e. processing aids, filler and vulcanizing agent are added. The mixing cycle is generally as follows:

| 1. | Addition of rubber (including time for banding of the rubber) | 2 minutes |
| 2. | Addition of phenolic resin (including fluxing time) | 10 minutes |
| 3. | Addition of filler and processing aids | 15 minutes |
| 4. | Addition of vulcanizing agent | 2 minutes |
| 5. | Blend and sheet off mill | 1 minute |

The composition is then compression molded for about 2 hours at about 325° F. to form the insulator.

EXAMPLE II

A composition was formed by the method of Example I using 100 parts of Paracril D, 120 parts of Durez 12687 and the amount of filler specified.

| Sodium Acetate — $NaCH_3CO_2$ | | | | | | | |
|---|---|---|---|---|---|---|---|
| Parts Filler | 40 | 50 | 60 | 70 | 80 | 90 | 100 |
| Insulation Index | 324 | 333 | 331 | 331 | 336 | 323 | 319 |
| Potassium Sulfite — $K_2SO_3$ | | | | | | | |
| Parts Filler | 40 | 50 | 60 | 70 | 80 | 90 | 100 |
| Insulation Index | 311 | 326 | 342 | 360 | 351 | 364 | 366 |
| Potassium Oxalate — $K_2C_2O_4$ | | | | | | | |
| Parts Filler | 40 | 50 | 60 | 70 | 80 | | |
| Insulation Index | 333 | 340 | 363 | 366 | 364 | | |
| Sodium Carbonate — $Na_2CO_3$ | | | | | | | |
| Parts Filler | 40 | 50 | 60 | 70 | 80 | 90 | 100 |
| Insulation Index | 301 | 314 | 331 | 332 | 322 | 343 | 337 |
| Boric Acid — $H_3BO_3$ | | | | | | | |
| Parts Filler | | | 60 | | 80 | | |
| Insulation Index | | | 240 | | 275 | | |
| Reference Stock — Rubber-Resin 100/120 (No Filler) | | | | | | | |
| Insulation Index | 194–196 | | | | | | |

Compositions were also formed using aluminum acetate, $Al_2O_3$ and $Pb_2O_3$ as fillers but they had no significant beneficial effect on the performance of the composition and in some cases the insulation index was lower than the unfilled composition.

EXAMPLE III

An insulator composition was prepared (method of Example I) by using 100 parts of Paracril D, 120 parts of Durez 12687 and 60 parts of potassium oxalate. The composition was additionally compounded with conventional processing and vulcanization aids comprising two parts of stearic acid, 5 parts of zinc oxide and three parts of tetramethylthiuram disulfide. After molding, the insulator had a tensile strength (23° C.) of 2770 psi and an elongation (23° C.) of 8%. The insulator gave excellent results when subjected to the testing procedures tabulated below.

| Insulation Index | 358 |
|---|---|
| ABL Peripheral Slab Char Rate | 1.7 |
| ABL Blast Tube | |
| Char Rate | 7.7 |
| Erosion Rate | 4.6 |

The composition was prepared as above but the amount of filler and phenolic resin was varied.

| Paracril D (parts) | 100 | 100 | 100 | 100 |
|---|---|---|---|---|
| Durez 12687 (parts) | 120 | 110 | 100 | 90 |
| Potassium oxalate (parts) | 50 | 47 | 45 | 43 |
| ABI Peripheral Slab Char Rate | 1.4 | 1.4 | 1.7 | 1.6 |

Again favorable results were obtained.

EXAMPLE IV

An insulator composition was prepared by milling 100 parts of Hycar 1051 and 120 parts of BKR-2620 for twenty minutes at 140° F. The mill was cooled (60°–80° F.) and 80 parts of boric acid filler was added along with conventional processing and vulcanization aids comprising two parts of stearic acid, 5 parts of zinc oxide and 3 parts of tetramethylthiuram disulfide. The composition was compression molded and gave the following results when subjected to the ABL Blast Tube Motor.

| Char rate | 5.5 mils/sec. |
|---|---|
| Erosion rate | 1.3 mils/sec. |

EXAMPLE V

The purpose of this example is to compare the properties of the insulating compositions of the invention with some of the insulators previously used, namely the Naval Research Laboratory Standard Stock (NRL) which comprises 100 parts of Hycar 1042 and 60 parts of silicon dioxide and the rigid phenolic-asbestos insulation AA Spauldite stock (Allegheney Ballistics Laboratory Standard) which comprises 45 parts of phenolic resin and 55 parts of asbestos. The results are summarized in the following table.

| Insulator | Density | Elongation % | O/A Torch Char Rate | ABL Peripheral Motor Char Rate | ABL Blast Tube Motor | | ABL Motor Char Rate | |
|---|---|---|---|---|---|---|---|---|
| | | | | | C.R. | E.R. | 25 sec. | 57 sec. |
| NRL Standard | 1.21 | 600 | 11 | 3.7 | 8.8 | 5.6 | 3.5–12 | 3.5–12 |
| AA Spauldite | 1.76 | 1 | — | 4.2 | 7.9 | 4.6 | — | — |
| Paracril D 100 parts Durez 12687 120 parts Potassium Sulfite 70 parts | 1.33 | 20 | 2.7 | 1.5 | 8.3 | 2.4 | .80 | 2.45 |
| Paracril D 100 parts Durez 12687 120 parts Sodium Acetate 40 parts | 1.19 | 12 | 3.1 | 1.5 | 8.8 | 5.0 | 3.12 | 1.05 |

These results indicate the superior properties of the insulators of this invention. Their use will result in a saving of space since their superior erosion resistant properties will allow them to be used in a thickness that is 60% less than (as calculated by the ABL Peripheral Motor Char Rate) the flexible insulator now used (NRL Standard).

The insulators of this invention have char and erosion resistant properties that are at least as good or superior to the rigid phenolic-asbestos insulators that are currently used. The insulators of the invention are superior to the asbestos type insulator in that they have a lower specific gravity thus reducing the overall weight of the insulator and in that they are flexible thus allowing them to follow chamber expansions.

The compositions of this invention are especially valuable as rocket motor casing insulators. The rubbery copolymer gives the insulator a sufficient flexibility so that it is able to follow the movements of the motor chamber occurs immediately after ignition while the phenolic resin imparts the necessary mechanical properties. The resin permits a wide range of fabrication possibilities and also contributes to the insulation effect by absorbing thermal energy. The filler material not only helps to prevent delamination by reinforcing the composition but also increases the insulation effect. This increase, however, is out of all proportion to the classical thermodynamic "heat sink" capacities of the fillers and thus they do not impart insulation properties solely through their endothermic transformation.

Obviously many modifications and variations of the present invention are possible in the light of the above teachings. It is therefore to be understood that within the scope of the appended claims, the invention may be practiced otherwise than as specifically described.

What is claimed is:

1. An improved char and erosion resistant ablative thermal insulator composition, which can be used for flexible combustion chambers which comprises:
   (a) 70–140 parts by weight of a phenolic-aldehyde resin,
   (b) 40–100 parts by weight of a filler selected from the group consisting of Group I and II metal phosphates, carbonates, acetates, oxalates and, sulfites, and
   (c) 100 parts by weight of a butadiene-acrylonitrile polymer having an acrylonitrile content between about 20 and 45%.

2. The insulator of claim 1 wherein said resin is a phenolic-formaldehyde resin.

3. The insulator of claim 1 wherein said filler is sodium acetate.

4. The insulator of claim 1 wherein said filler is potassium sulfite.

5. The insulator of claim 1 wherein said filler is potassium oxalate.

6. The insulator of claim 1 wherein said filler is sodium carbonate.

7. The insulator of claim 1 wherein 60 to 80 parts by weight of filler is present.

8. A process for forming an improved char and erosion resistant ablative thermal insulator which comprises:
   (a) forming a composition comprising a 100 parts by weight butadiene-acrylonitrile polymer having from 20–45% acrylonitrile, 40 to 100 parts by weight of a phenolic-aldehyde resin, and 70–140 parts by weight of a filler selected from the group consisting of Group I and II metal phosphates, carbonates, acetates, oxalates, and sulfites, and said composition being formed by the steps comprising, banding said copolymer, dispersing said resin in said copolymer at a temperature between about 140° and 300° F., and adding said filler to the mixture of the copolymer and resin, and
   (b) molding said composition to form the insulator.

* * * * *